Dec. 10, 1968  C. D. McDONALD  3,415,670
METHOD AND COMPOSITION FOR SURFACE FINISHING
PHOTOGRAPHS OR THE LIKE
Filed April 1, 1965

Charles D. McDonald
INVENTOR.

BY
Attorneys

United States Patent Office 3,415,670
Patented Dec. 10, 1968

3,415,670
METHOD AND COMPOSITION FOR SURFACE FINISHING PHOTOGRAPHS OR THE LIKE
Charles D. McDonald, P.O. Box 22224, McDonald Photo Products Inc., Dallas, Tex. 75222
Filed Apr. 1, 1965, Ser. No. 444,549
5 Claims. (Cl. 117—10)

ABSTRACT OF THE DISCLOSURE

A composition comprising a synthetic resinous film-former including nitrocellulose, alkyd resin, plasticizer, silica, an ultraviolet screening agent, alcohol, ester ketones, acidic stabilizers in a petroleum solvent vehicle. The composition is applied to the surface of photographs or the like, and prior to curing thereof, is normally manipulated in any suitable manner to texture the film-former.

---

This invention relates generally to the method and composition for finishing photographic prints, and more particularly to a clear, abrasive resistant, washable finish which does not degrade the color, crispness or even the finest details, of photographs, murals, transparencies, displays, and art work.

Additionally, this process relates to a method and a composition for providing a variety of textures to the surface of color or black and white photographs, or the like.

Utilizing my method it is possible to provide a much more durable surface for the photograph, or the like than is generally possible with methods known heretofore. Additionally, subsequent to treatment of the photograph, or the like, by the method disclosed herein the photographs will withstand considerable abrasion, and may be cleaned with detergents and cleaners. The photographs or the like may therefore be framed without the necessity of utilizing glass, resulting in a more brilliant picture than an unprotected picture which must be protected by the use of a cover glass which is either of the clear, or etched surface, non-glare type glass.

By means of the instant method it is possible to put an almost infinite variety of surface textures on otherwise smooth photographs, or the like, thereby enabling the photographer to provide a surface texture having the appearance of suede leather, velvet, or an oil or pastel portrait, for example.

Heretofore, attempts have been made to provide photographs, or the like with a surface texture of this nature by embossing their surfaces. This method of providing a photograph with a surface texture is not entirely satisfactory due to the fact that the emulsion of the photograph is disturbed by the physical manipulation of the base paper which often causes discontinuities to develop in the emulsion with a subsequent loss of clarity, brilliancy, etc., all of which detract from the desirability of the final photograph, or the like.

In the practice of the present invention the various effects desired may be achieved with the utilization of photographically sensitized paper, or the like, which has a substantially smooth surface. In addition to greatly reducing the inventory of photographic papers which must normally be kept in stock by a processor, this greatly facilitates the correction or toning of the photographic prints due to the fact that such correction, etc., may be more readily made on a surface having a relatively smooth texture.

It is therefore a primary object of this invention to provide a method and composition for surface finishing photographs, or the like, to provide a protective and decorative finish to the photograph, or the like.

Another object of this invention is to provide a composition for finishing photographs, or the like which is waterproof and abrasion resistant to enable display of the photographs, or the like so treated without the necessity of protecting them with a cover glass.

A further object of this invention is to provide a photographer or photo-finisher with a protective surface with a wide variety of textures from only one type of paper, which textured surfaces may be applied after all corrective work has been done on the print.

Still another object of this invention is to provide a composition for surface finishing photographs, or the like which includes a means to minimize fading of the colors and dyes utilized in producing color photographs, etc.

Still a further object of this invention is to provide a method and composition for surface finishing photographs, or the like, which provides a variety of surface textures to the photographs, or the like, without the necessity of physically deforming the photographic surface or emulsion thereof.

Briefly the practice of the present invention involves applying the novel composition of the present invention to a photograph, or the like, and allowing the coating to dry sufficiently so that it may be worked with a brush, roller, cloth or the like to produce the final desired effect. Normally the textured coating is then overcoated with a second coating to impart a desired luster to the surface of the photograph, or the like.

These together with other objects and advantages which will become subsequently apparent reside in the method and composition utilized therein as more fully hereinafter described and claimed, reference being had to the accompanying drawings forming a part hereof, wherein like numerals refer to like parts throughout, and in which:

FIGURE 3 is a cross-sectional view of a paper substrate with a photographic emulsion thereon, showing the photograph coated with one embodiment of the present composition for surface finishing photographs, or the like;

FIGURE 7 is a fragmentary plan view of a photograph, or the like, treated in accordance with the present invention wherein a brush stroke texture has been imparted to the surface of the photograph, or the like.

Figure 1:
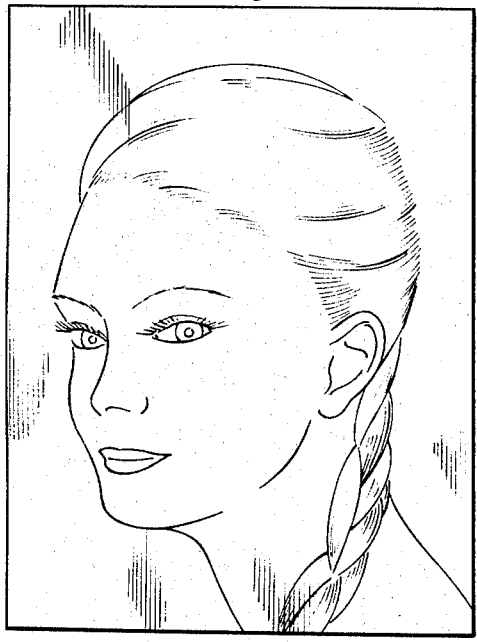
FIGURE 1 is a plan view of a photograph prior to treatment by the method and with the composition set forth herein.
Figure 2:
FIGURE 2 is a plan view of the photograph of FIGURE 1 subsequent to treatment in accordance with the invention.
Figure 3:
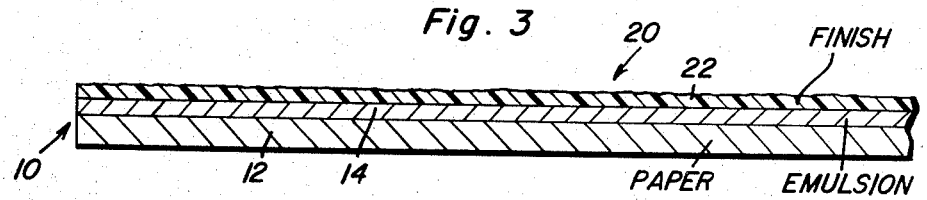
Figure 4:
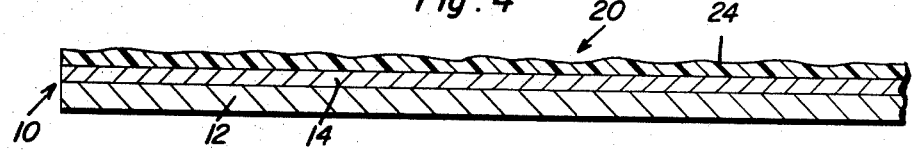
FIGURE 4 is a cross-sectional view of a photographic paper having a substrate coated with a photographic emulsion, further showing the photograph having been coated with another embodiment of a composition of the instant invention, further showing the pronounced texture obtainable with the utilization of the instant method and composition.

In accordance with the present invention a photograph 10 which includes a paper backing 12 and a photo-sensitive emulsion 14, is provided with a protective, decorative finish indicated generally at 20, which comprises a resinous composition 22 applied to the photograph 10 in contiguous relationship with the photosensitive emulsion 14, as seen in FIGURE 3. The resinous layer 22 is utilized when a minimum of surface texturing is desired, and also as a top coat over more highly textured finishes applied in accordance with the present invention, such as a second resinous finish 24.

The finishes 22 and 24 comprise formulations including nitrocellulose, alkyd resin, plasticizer, silica, an ultraviolet screen, alcohol, ester, ketones, acetic stabilizers, and a suitable aromatic petroleum solvent.

The two finishes 22 and 24 respectively, are formulated as shown in the following table:

TABLE I

| Ingredients | Percent by weight | |
| --- | --- | --- |
|  | Finish 24 | Finish 22 |
| R. S. nitrocellulose, 11.8 to 12.2% nitrogen | 8.52 | 8.52 |
| Dioctyl phthalate | 2.37 | 2.37 |
| Alkyd resin, 35% phthalic anhydride | 10.19 | 10.19 |
| Colloidal silica | 0.26 | 0.26 |
| Silica hydrogel, pH-2.4, particle size, 4 micron | 9.79 |  |
| Citric acid | 0.11 | 0.11 |
| Ultraviolet light absorber, substituted acrylonitrile or substituted benzophenone absorption characteristics from 2,000A. to 4,000A | 0.26 | 0.26 |
| Methyl ethyl ketone | 10.79 | 10.79 |
| Methyl isobutyl ketone | 13.50 | 13.50 |
| Refined acetone | 2.60 | 2.60 |
| Isopropyl acetate | 2.75 | 2.75 |
| Butyl acetate | 0.65 | 0.65 |
| Ethyl acetate | 2.30 | 2.30 |
| Ethyl alcohol, denatured | 0.16 | 0.16 |
| Isopropyl alcohol | 6.29 | 6.29 |
| n-Butyl alcohol | 5.03 | 5.03 |
| Toluol | 27.67 | 27.67 |
| Xylol | 4.37 | 4.37 |
| Shell tolu-sol #83255 (petroleum naphtha) | 1.38 | 1.38 |

The photographs 10, or the like to be treated may either be mounted or unmounted and for ease in handling it is preferably held in place on a vacuum box or may be secured by pressing to a double sided adhesive tape.

The finishing compositions 22 and 24 are then applied a method which is to be described by spraying, brushing or rolling onto the emulsion 14 of the photograph 10, or the like. To a certain extent the thickness of the coating 22 and 24 determines the fineness or coarseness of the finished texture. It has been found that by the application or application and manipulation of the finishes 22 and 24 that a wide variety of textures can be achieved.

Some of the surfaces or textures that can be produced by the application and manipulation of the material are:

I. An oil painting brush stroke surface
II. A linen or canvas type texture
III. The standard "G" photographic papers i.e., a fine stipple surface or a coarse stipple finish
IV. A surface like a rough nubby weave fabric
V. A finish that feels like fine morocco leather
VI. A finish that feels like fine suede leather
VII. A raised pattern of fine lines similar to in appearance to engraving textured screen.

EXAMPLE I

To protect the photograph as shown in FIGURE 3 the finish 22 compounded in accordance with Table I may preferably be applied with a suitable spray gun at approximately 30 pounds pressure. The finish 22 would be appled from a distance of about ten to twelve inches from the surface of the photograph 10 overlapping strokes about one-half inch to produce a medium wet coat. The finish as shown in FIGURE 3 is primarily a protective coating and due to its relatively smooth finish does not substantially alter the texture of the surface.

EXAMPLE II

Figure 5:
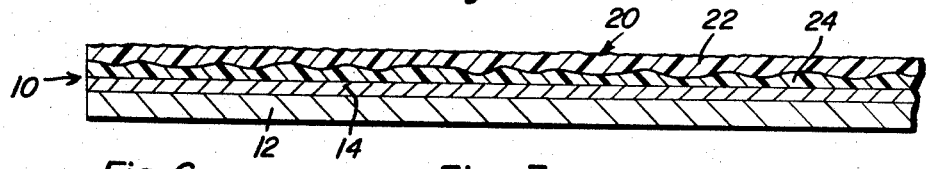
FIGURE 5 is a cross-sectional view of a photographic paper having a substrate coated with a photographic emulsion and textured as shown in FIGURE 4, further including a top coating analogous to the top coating of the lamina of FIGURE 3.
Figure 6:
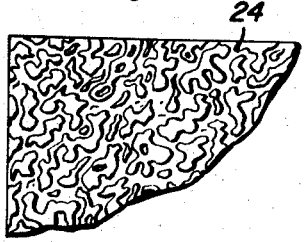
FIGURE 6 is a fragmentary plan view of a portion of a photograph or the like treated in accordance with the present invention showing one type of surface finish obtainable.
Figure 7:
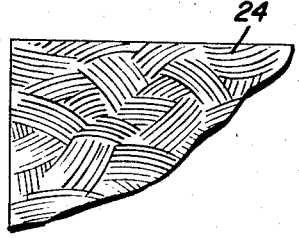

To achieve the finishes illustrated in FIGURE 2, 4, 5, 6 and 7 the finishing composition 24 would be applied to the emulsion 14 of the photograph, or the like, with a thickness of somewhat greater depth than the deepest surface indentation anticipated. While the finishing composition 24 is still tacky the entire surface may be rapidly worked with a texturing tool, or brush or the like to produce a simulated brush oil paint surface such as illustrated in FIGURE 7. In cross-section the photograph or the like finished in this manner would have a cross-sectional configuration illlustrated in FIGURE 4. To improve the luster of the surface one or more coats of the finishing composition 22 may be applied on top of the finishing composition 24 by spraying, brushing or the like on top of its contiguous relationship to the dry finishing composition 24, as seen in FIGURE 5.

EXAMPLE III

To achieve the "G" surface the finishing composition 24 would be sprayed onto the emulsion 14 utilizing a spray gun at an air pressure of approximately ten to twenty pounds. The spray would be applied from twelve to fifteen inches from the surface and from an angle from fifteen to twenty degrees. The entire surface of the photograph, or the like would preferably be sprayed from two or more sides with a uniform pattern. One or more coats of the finish composition 22 would then be applied over the finish 24.

EXAMPLE IV

Stipple finish

The finishing composition 24 is applied with either a brush or a spray gun to provide a uniform medium to heavy coat. When the coat applied has become tacky it is stippled with a very firm vertical stroke. After allowing sufficient time for drying one or more coats of the somewhat less viscous finishing coating 22 are applied over the finishing composition 24.

EXAMPLE V

Morocco finish

The finishing composition 24 is sprayed on at approximately ten to twenty pounds air pressure from approximately twelve to fifteen inches from the surface of the photograph, or the like, at a suitable inclination with regard to the surface. The entire surface of the photograph or the like is covered with an even spatter pattern preferably applied from two directions to break up the uniformity of the spatter particles. After allowing sufficient time for the surface to dry the surface is sanded lightly with a sandpaper of approximately 400 grit to flatten the apices of the spatter particles and any dust brushed off. One or more coats of the finishing composition 22 are then applied over the finishing composition 24.

EXAMPLE VI

Sprayed surface

A coat of the finished composition 22 is applied to the emulsion 14 of the photograph 10, or the like, and allowed to dry. This is covered by a coat of the finishing composition 24 applied in a fine spray the air pressure of fiften to eighteen pounds and a fluid pressure of approximately eight pounds using a generally vertically disposed application. After allowing sufficient time for the finishing composition 24 to dry one or more coats of finishing composition 22 are applied over the finishing composition 24.

What is claimed as new is as follows:
1. A method of providing photographs and the like having a relatively smooth surface with a clear, textured, abrasive resistant, washable resinous finish which method includes coating the photograph with a composition comprising on the basis of weight:

| R.S. nitrocellulose, 11.8 to 12.7% nitrogen | 8.52 |
|---|---|
| Dioctyl phthalate | 2.37 |
| Alkyd resin, 35% phthalic anhydride | 10.19 |
| Colloidal silica | 0.26 |
| Citric acid | 0.11 |
| Ultraviolet light absorber, substituted acrylonitrile or substituted benzophenone absorption characteristics from 2,000A. to 4,000A. | 0.26 |
| Methyl ethyl ketone | 10.79 |
| Methyl isobutyl ketone | 13.50 |
| Refined acetone | 2.60 |
| Isopropyl acetate | 2.75 |
| Butyl acetate | 0.65 |
| Ethyl acetate | 2.30 |
| Ethyl alcohol, denatured | 0.16 |
| Isopropyl alcohol | 6.29 |
| n-Butyl alcohol | 5.03 |
| Toluol | 27.67 |
| Xylol | 4.37 |
| Petroleum naphtha | 1.38 | and manipulating the surface of said coating prior to drying thereof to texture the coating.

2. A method of providing photographs and the like having a relatively smooth surface with a clear abrasive resistant washable textured resinous finish which method includes coating the photograph with a composition comprising on the basis of weight:

| R.S. nitrocellulose, 11.8% 12.2% nitrogen | 8.52 |
|---|---|
| Dioctyl phthalate | 2.37 |
| Alkyd resin, 35% phthalic anhydride | 10.19 |
| Colloidal silica | 0.26 |
| silica hydrogel, pH-2.4, particle size-4 micron | 9.79 |
| Citric acid | 0.11 |
| Ultraviolet light absorber, substituted acrylonitrile or substituted benzophenone absorption characteristics from 2,000A. to 4,000A. | 0.26 |
| Methyl ethyl ketone | 10.79 |
| Methyl isobutyl ketone | 13.50 |
| Refined acetone | 2.60 |
| Isopropyl acetate | 2.75 |
| Butyl acetate | 0.65 |
| Ethyl acetate | 2.30 |
| Ethyl alcohol, denatured | 0.16 |
| Isopropyl alcohol | 6.29 |
| n-Butyl alcohol | 5.03 |
| Toluol | 27.67 |
| Xylol | 4.37 |
| Petroleum naphtha | 1.38 | manipulating the surface of said coating prior to drying thereof to provide a pronounced textured surface and overcoating said textured surface with a composition comprising on the basis of weight:

| R.S. nitrocellulose, 11.8% 12.2% nitrogen | 8.52 |
|---|---|
| Dioctyl phthalate | 2.37 |
| Alkyd resin, 35% phthalic anhydride | 10.19 |
| Colloidal silica | 0.26 |
| Citric acid | 0.11 |
| Ultraviolet light absorber, substituted acrylonitrile or substituted benzophenone absorption characteristics from 2,000A. to 4,000A. | 0.26 |
| Methyl ethyl ketone | 10.79 |
| Methyl isobutyl ketone | 13.50 |
| Refined acetone | 2.60 |
| Isopropyl acetate | 2.75 |
| Butyl acetate | 0.65 |
| Ethyl acetate | 2.30 |
| Ethyl alcohol, denatured | 0.16 |
| Isopropyl alcohol | 6.29 |
| n-Butyl alcohol | 5.03 |
| Toluol | 27.67 |
| Xylol | 4.37 |
| Petroleum naphtha | 1.38 |

3. A method of providing photographs and the like having a relatively smooth surface with a clear abrasive resistant washable textured resinous finish which method includes coating the photograph by spray application with a composition comprising on the basis of weight:

| R.S. nitrocellulose, 11.8% 12.2% nitrogen | 8.52 |
|---|---|
| Dioctyl phthalate | 2.37 |
| Alkyd resin, 35% phthalic anhydride | 10.19 |
| Colloidal silica | 0.26 |
| Silica hydrogel, pH-2.4, particle size-4 micron | 9.79 |
| Citric acid | 0.11 |
| Ultraviolet light absorber, substituted acrylonitrile or substituted benzophenone absorption characteristics from 2,000A. to 4,000A. | 0.26 |
| Methyl ethyl ketone | 10.79 |
| Methyl isobutyl ketone | 13.50 |
| Refined acetone | 2.60 |
| Isopropyl acetate | 2.75 |
| Butyl acetate | 0.65 |
| Ethyl acetate | 2.30 |
| Ethyl alcohol, denatured | 0.16 |
| Isopropyl alcohol | 6.29 |
| n-Butyl alcohol | 5.03 |
| Toluol | 27.67 |
| Xylol | 4.37 |
| Petroleum naphtha | 1.38 |

4. A composition for surface finishing photographs and the like with a clear abrasive resistant, washable finish comprising on the basis of weight:

| R.S. nitrocellulose, 11.8% 12.2% nitrogen | 8.52 |
|---|---|
| Dioctyl phthalate | 2.37 |
| Alkyd resin, 35% phthalic anhydride | 10.19 |
| Colloidal silica | 0.26 |
| Citric acid | 0.11 |
| Ultraviolet light absorber, substituted acrylonitrile or substituted benzophenone absorption characteristics from 2,000A. to 4,000A. | 0.26 |
| Methyl ethyl ketone | 10.79 |
| Methyl isobutyl ketone | 13.50 |
| Refined acetone | 2.60 |
| Isopropyl acetate | 2.75 |
| Butyl acetate | 0.65 |
| Ethyl acetate | 2.30 |
| Ethyl alcohol, denatured | 0.16 |
| Isopropyl alcohol | 6.29 |
| n-Butyl alcohol | 5.03 |
| Toluol | 27.67 |
| Xylol | 4.37 |
| Petroleum naphtha | 1.38 |

5. The composition of claim 4 including on the basis of weight about 9.79 parts of silica hydrogel of about pH 2.4 and particle size of 4 microns.

References Cited

UNITED STATES PATENTS

| 1,608,281 | 11/1926 | Weber | 117—10 |
|---|---|---|---|
| 1,720,787 | 7/1929 | Foss et al. | 117—10 |
| 1,752,011 | 3/1930 | Latter | 117—10 |
| 2,131,882 | 10/1938 | Armor et al. | 117—10 |
| 2,170,187 | 8/1939 | Clarke | 260—16 |
| 2,468,920 | 5/1949 | Brown et al. | 260—16 X |

WILLIAM D. MARTIN, *Primary Examiner.*

R. HUSACK, *Assistant Examiner.*

U.S. Cl. X.R.

117—76, 33.3; 260—16, 32.8, 31.2, 33.4